United States Patent
Shim et al.

(10) Patent No.: US 9,261,719 B2
(45) Date of Patent: Feb. 16, 2016

(54) LIQUID CRYSTAL SHUTTER AND IMAGE CAPTURING APPARATUS

(71) Applicant: SAMSUNG ELECTRONICS CO., LTD., Suwon-si, Gyeonggi-do (KR)

(72) Inventors: Jae-kyu Shim, Ansan-si (KR); Bon-min Koo, Seoul (KR); Yu-kyung Ham, Suwon-si (KR); Kun-woo Lee, Suwon-si (KR); Woo-jong Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 141 days.

(21) Appl. No.: 13/936,520

(22) Filed: Jul. 8, 2013

(65) Prior Publication Data

US 2014/0104517 A1    Apr. 17, 2014

(30) Foreign Application Priority Data

Oct. 17, 2012    (KR) .................. 10-2012-0115532

(51) Int. Cl.
  *G02F 1/133*    (2006.01)
  *G02F 1/13*     (2006.01)
  *G02F 1/1333*   (2006.01)
  *H04N 13/02*    (2006.01)

(52) U.S. Cl.
  CPC .......... *G02F 1/1313* (2013.01); *G02F 1/133382* (2013.01); *H04N 13/021* (2013.01)

(58) Field of Classification Search
  CPC ............ G02F 1/133382; G02F 1/1313; H04N 13/021
  USPC .................................... 349/21, 161
  See application file for complete search history.

(56) References Cited

U.S. PATENT DOCUMENTS

| | | | |
|---|---|---|---|
| 4,907,859 A * | 3/1990 | Takada et al. | 349/161 |
| 7,019,780 B1 | 3/2006 | Takeuchi et al. | |
| 8,184,217 B1 * | 5/2012 | Galstian et al. | 349/18 |
| 2004/0165139 A1 * | 8/2004 | Anderson et al. | 349/155 |
| 2005/0041020 A1 * | 2/2005 | Roes et al. | 345/211 |
| 2007/0131914 A1 * | 6/2007 | Elschner et al. | 257/40 |
| 2009/0135318 A1 | 5/2009 | Tateuchi et al. | |
| 2011/0242287 A1 | 10/2011 | Cieslinski et al. | |

(Continued)

FOREIGN PATENT DOCUMENTS

| | | |
|---|---|---|
| EP | 2 403 255 A2 | 1/2012 |
| JP | 2010-276826 A | 12/2010 |

(Continued)

OTHER PUBLICATIONS

Extended Search Report issued for EP 13187663.3 (Jan. 27, 2014).

(Continued)

*Primary Examiner* — Bumsuk Won
*Assistant Examiner* — Ryan Crockett
(74) *Attorney, Agent, or Firm* — Drinker Biddle & Reath LLP

(57) ABSTRACT

A liquid crystal shutter includes: a first plate including a first transparent electrode layer, a second plate disposed parallel to the first plate and including a second transparent electrode layer, a liquid crystal layer disposed between the first plate and the second plate and is configured to transmit or block light according to a first potential difference between the first transparent electrode layer and the second transparent electrode layer, and a heating electrode configured to generate a second potential difference for generating heat in the first transparent electrode layer.

14 Claims, 14 Drawing Sheets

(56) References Cited

U.S. PATENT DOCUMENTS

| | | | |
|---|---|---|---|
| 2011/0299015 A1* | 12/2011 | Liu et al. | 349/96 |
| 2011/0310331 A1* | 12/2011 | Heo et al. | 349/64 |
| 2012/0002099 A1* | 1/2012 | Tajiri | 348/362 |
| 2012/0026417 A1 | 2/2012 | Yamamoto et al. | |
| 2012/0133745 A1 | 5/2012 | Takizawa | |
| 2012/0162389 A1 | 6/2012 | Seo | |

FOREIGN PATENT DOCUMENTS

| | | |
|---|---|---|
| KR | 10-2012-0057527 A | 6/2012 |
| KR | 10-2012-0071964 A | 6/2012 |
| WO | 2005/003849 A1 | 1/2005 |
| WO | 2012/047962 A1 | 4/2012 |

OTHER PUBLICATIONS

International Search Report and Written Opinion issued for PCT/KR2013/009249 (Jan. 29, 2014).

Examination Report issued in related application AU 2013332588, Dec. 18, 2015, 3 pages.

* cited by examiner

LIQUID CRYSTAL SHUTTER AND IMAGE CAPTURING APPARATUS

CROSS-REFERENCE TO RELATED APPLICATION

This application claims priority from Korean Patent Application No. 10-2012-0115532, filed on Oct. 17, 2012, in the Korean Intellectual Property Office, the disclosure of which is incorporated herein by reference in its entirety.

BACKGROUND

1. Field

Apparatuses and methods consistent with exemplary embodiments relate to a liquid crystal shutter and an image capturing apparatus, and more particularly, to a pair of liquid crystal shutters capable of dividing one optical path into two optical paths when imaging a three-dimensional (3D) image and an image capturing apparatus including the same.

2. Description of the Related Art

Techniques, which image 3D images (stereoscopic images) and display the imaged 3D images, have been already available.

One method of imaging 3D images involves alternately imaging a left-eye image and a right-eye image. Such an imaging method is classified into a method (2L2S method) of using two sets of independent lenses and two image sensors, a method (2L1S method) of using two sets of independent lenses and one image sensor, and a method (1L1S) of using one set of lenses and one image sensor.

The 1L1S 3D image imaging method is advantageous because it is easy to manufacture products in a small size when compared to other methods, and because it is possible to manufacture a 2D/3D compatible lens in the same size as a 2D lens, if an optical path division module configured to divide an optical path into a left optical path and a right optical path is manufactured in an open/close structure.

In the 1L1S 3D image imaging method, a pair of liquid crystal shutters corresponding to the left optical path and the right optical path may be used as the optical path division module. The left optical path and the right optical path may be alternately blocked by the pair of liquid crystal shutters to image a left-eye image and a right-eye image constituting a 3D image. The liquid crystal shutters alternately perform open/close operations to unshield/shield optical paths with a considerably short cycle when imaging the 3D image.

In general, since a response speed of a liquid crystal layer with respect to a driving voltage is sufficiently reasonable in a room temperature environment, problems are not caused when the liquid crystal shutters perform the open/close operations to unshield/shield the optical paths with the short cycle. However, since the response speed of the liquid crystal layer with respect to the driving voltage is considerably reduced with an increase in viscosity of the liquid crystal layer in a low temperature environment (for example, at −10° C.), the liquid crystal shutters cannot smoothly perform the open/close operations to unshield/shield the optical paths when the liquid crystal shutters are driven with the short cycle.

SUMMARY

One or more exemplary embodiments may overcome the above disadvantages and other disadvantages not described above. However, it is understood that one or more exemplary embodiments are not required to overcome the disadvantages described above, and may not overcome any of the problems described above.

One or more exemplary embodiments provide a liquid crystal shutter capable of smoothly performing open/close operations to unshield/shield an optical path for imaging a three-dimensional (3D) image even in a low temperature environment, and provide an image capturing apparatus including the same.

According to an exemplary embodiment, a liquid crystal shutter is provided. The liquid crystal shutter may include: a first plate including a first transparent electrode layer; a second plate disposed parallel to the first plate and including a second transparent electrode layer; a liquid crystal layer disposed between the first plate and the second plate and is configured to transmit or block light according to a first potential difference between the first transparent electrode layer and the second transparent electrode layer; and a heating electrode configured to generate a second potential difference for generating Joule heating in the first transparent electrode layer.

The liquid crystal shutter may further include: a first electrode and a second electrode electrically connected to the first transparent electrode layer and the second transparent electrode layer, respectively, so as to generate the first potential difference between the first transparent electrode layer and the second transparent electrode layer.

The second potential difference may be formed between the heating electrode and the first electrode.

The second transparent electrode layer may include an effective electrode layer including an effective area covered by the liquid crystal layer and in which the second electrode is disposed, a right electrode layer disposed separately from the effective electrode layer on a right side of the effective electrode layer and in which the first electrode is disposed, and a left electrode layer disposed separately from the effective electrode layer on a left side of the effective electrode layer and in which the heating electrode is disposed.

The liquid crystal shutter may further include: a first conductive member configured to electrically connect the first electrode and the first transparent electrode layer, and a second conductive member configured to electrically connect the heating electrode and the first transparent electrode layer.

The first and second conductive members may be disposed to face each other with the effective area interposed therebetween and may extend along two opposite sides of the effective area, respectively.

Each of the first and second conductive members may be formed of silver paste or conductive bond.

According to another exemplary embodiment, a liquid crystal shutter is provided. The liquid crystal shutter may include: a first plate including a first transparent electrode layer; a second plate disposed parallel to the first plate and including a second transparent electrode layer; a liquid crystal layer disposed between the first plate and the second plate and is configured to transmit or block light according to a first potential difference between the first transparent electrode layer and the second transparent electrode layer; a first heating electrode configured to generate a second potential difference for generating Joule heating in the first transparent electrode layer; and a second heating electrode configured to generate a third potential difference for generating Joule heating in the second transparent electrode layer.

The liquid crystal shutter may further include: a first electrode and a second electrode electrically connected to the first transparent electrode layer and the second transparent electrode layer, respectively, so as to generate the first potential difference between the first transparent electrode layer and the second transparent electrode layer.

According to another exemplary embodiment, an image capturing apparatus is provided. The image capturing apparatus may include: an imaging device; a plurality of imaging lenses configured to form an optical path between an object and the imaging device; first and second liquid crystal shutters configured to divide the optical path into a first optical path and a second optical path when capturing a three-dimensional image; first and second shutter drivers configured to drive the first and second liquid crystal shutters, respectively; and a controller configured to control operations of the first and second shutter drivers. Each of the first and second liquid crystal shutters may include: a first plate including a first transparent electrode layer; a second plate disposed parallel to the first plate and including a second transparent electrode layer; a liquid crystal layer disposed between the first plate and the second plate and is configured to transmit or block light according to a first potential difference between the first transparent electrode layer and the second transparent electrode layer; and a heating electrode configured to generate a second potential difference for generating Joule heating in the first transparent electrode layer.

Each of the liquid crystal shutters may further include: a first electrode and a second electrode electrically connected to the first transparent electrode layer and the second transparent electrode layer, respectively, so as to generate the first potential difference between the first transparent electrode layer and the second transparent electrode layer.

The second potential difference may be formed between the heating electrode and the first electrode.

Each of the first and second shutter drivers may include: a first switching unit configured to selectively connect the first electrode to either a first power supply or a ground, a second switching unit configured to selectively connect the second electrode to either the first power supply or the ground, and a third switching unit configured to connect the heating electrode to either a second power supply or the ground.

The image capturing apparatus may further include a first temperature sensor configured to sense an ambient temperature.

During a heating interval belonging to an interval during which a corresponding liquid crystal shutter blocks light, when the ambient temperature sensed by the first temperature sensor is less than a reference temperature, each of the first and second shutter drivers may connect the first electrode to the first power supply and connect the heating electrode to the ground, or connect the first electrode to the ground and connect the heating electrode to the second power supply.

During a stand-by time period prior to starting an image capturing operation, when the ambient temperature sensed by the first temperature sensor is less than a reference temperature, each of the first and second shutter drivers may connect the first electrode to the first power supply and connect the heating electrode to the ground, or connect the first electrode to the ground and connect the heating electrode to the second power supply.

Each of the first and second liquid crystal shutters may further include a second temperature sensor configured to measure a shutter temperature thereof.

The controller may determine the heating interval based on the shutter temperature sensed by the second temperature sensor.

The image capturing apparatus may be a digital camera.

Additional aspects and advantages of the exemplary embodiments will be set forth in the detailed description, will become apparent from the detailed description, or may be learned by practicing the exemplary embodiments.

BRIEF DESCRIPTION OF THE DRAWINGS

The above and/or other aspects will become more apparent by describing in detail exemplary embodiments, with reference to the accompanying drawings, in which.

DETAILED DESCRIPTION

Figure 1:
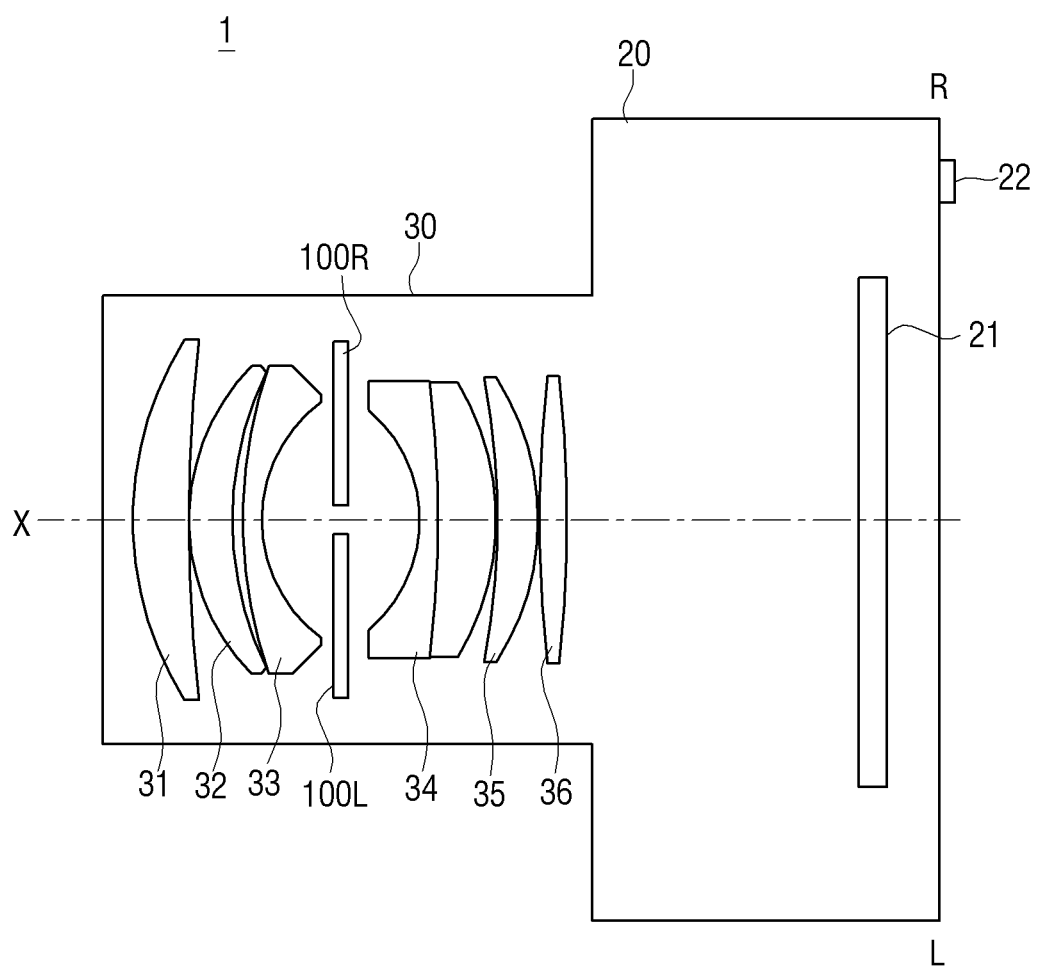
FIG. 1 is a cross-sectional view schematically illustrating an image capturing apparatus, according to an exemplary embodiment.

Hereinafter, exemplary embodiments will be described in more detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1 is a cross-sectional view schematically illustrating an image capturing apparatus, according to an exemplary embodiment.

Referring to FIG. 1, as an example of an image capturing apparatus, a digital camera 1 including a camera body 20 and a lens barrel 30 is illustrated.

The camera body 20 includes an imaging device 21 arranged to be perpendicular to an optical axis X therein. The imaging device 21 may include a digital image sensor such as a charge coupled device (CCD) sensor or a complementary metal oxide semiconductor (CMOS) image sensor.

A temperature sensor (first temperature sensor) 22 configured to sense an ambient temperature around the digital camera 1 is mounted on an outer surface of the camera body 20. The ambient temperature sensed by the first temperature sensor 22 is used as data, which is the basis for determining whether or not a first and second liquid crystal shutters 100R and 100L are heated, and a heating time of the first and second liquid crystal shutters 100R and 100L, which will be described later.

The lens barrel 30 includes a plurality of lens, e.g., a first lens to a sixth lens) 31 to 36, and the first and second liquid crystal shutters 100R and 100L constituting an optical path division module.

The plurality of lens 31 to 36 is configured to form an optical path between an object and the image device 21. More specifically, the plurality of lens 31 to 36 moves along the optical axis (the X-axis) to perform a zooming operation and a focusing operation.

The first and second liquid crystal shutters 100R and 100L, which constitute the optical path division module, divide an optical path between the object and the imaging device 21 into a first optical path (a right optical path) and a second optical path (a left optical path) when capturing a 3D image. When capturing a 2D image, the first and second liquid crystal shutters 100R and 100L do not have to alternately perform open/close operations to unshield/shield the optical path, and thus the optical path between the object and the image device 21 is not divided.

In the exemplary embodiment, the first and second liquid crystal shutters 100R and 100L have been illustrated to be disposed between the third lens 33 and the fourth lens 34, but the arrangement position of the first and second liquid crystal shutters 100R and 100L may be selected differently according to various exemplary embodiments. For example, the first and second liquid crystal shutters 100R and 100L may be disposed between two other lenses (for example, between the fourth lens 34 and the fifth lens 35), disposed in front of the plurality of lenses 31 to 36, or disposed in rear of the plurality of lenses 31 to 36. In general, the first and second liquid crystal shutters 100R and 100L may be installed in a position in which an iris is typically disposed in the lens barrel 30.

Figure 2:
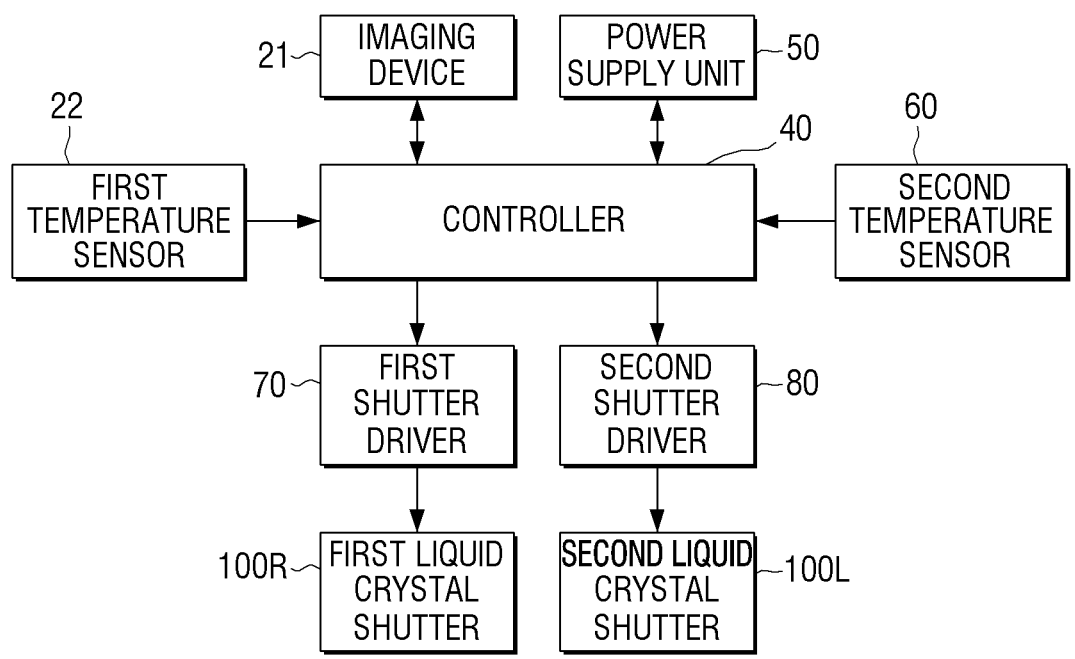
FIG. 2 is a block diagram illustrating configurations related to an operation of liquid crystal shutters provided in the image capturing apparatus of FIG. 1, according to an exemplary embodiment.

The above-described digital camera 1 may also include additional components 40, 50, 60, 70, and 80 illustrated in FIG. 2 in connection with operations of the above-described first and second liquid crystal shutters 100R and 100L as illustrated in FIG. 1, according to an exemplary embodiment.

Referring to FIG. 2, the digital camera 1 further includes a controller 40, a power supply 50, a second temperature sensor unit 60, and first and second shutter drivers 70 and 80.

The controller 40 control operations of the additional components in the digital camera 1.

For example, the controller 40 controls operations of the first and second shutter drivers 70 and 80 to control shielding/unshielding of first and second optical paths by the first and second liquid crystal shutters 100R and 100L.

As another example, the controller 40 determines a heating state and a heating time of the first and second liquid crystal shutters 100R and 100L based on the ambient temperature sensed by the first temperature sensor 22, and controls the operation of the first and second shutter drivers 70 and 80 according to the determination. Specifically, the controller 40 may compare the ambient temperature sensed by the first temperature sensor 22 with a reference temperature, determine that the digital camera is in a low temperature environment if the ambient temperature is lower than the reference temperature, and control the first and second shutter drivers 70 and 80 to heat the first and second liquid crystal shutters 100R and 100L. At this time, the heating time (or an amount of heat) may be determined based on the difference value between the ambient temperature and the reference temperature.

The power supply 50 supplies power required to operate the additional components in the digital camera 1. For example, the power supply 50 provides power required for performing zooming and focusing operations to the lens barrel 30, power required for driving of the first and second liquid crystal shutters 100R and 100L, power required for performing a control operation of the controller 40, and the like. The amount of power supplied by the power supply 50 may also be controlled by the controller 40.

The second temperature sensor unit 60 is configured to sense temperatures of the first and second liquid crystal shutters 100R and 100L, and includes a second temperature sensor 61 (see FIG. 5) provided to each of the first and second liquid crystal shutters 100R and 100L. As will be described later, the controller 40 determines the heating time for each of the first and second liquid crystal shutters 100R and 100L based on the temperature sensed by the second temperature sensor 61 during the capturing of a 3D image.

The first and second shutter drivers 70 and 80 drive the first and second liquid crystal shutters 100R and 100L, respectively, under the control of the controller 40. For example, the first and second shutter drivers 70 and 80 drive the first and second liquid crystal shutters 100R and 100L to perform open/close operations to unshield/shield the right optical path and the left optical path, respectively.

The optical path division by the first and second liquid crystal shutters 100R and 100L will be described with reference to FIGS. 3A and 3B.

Figure 3A:
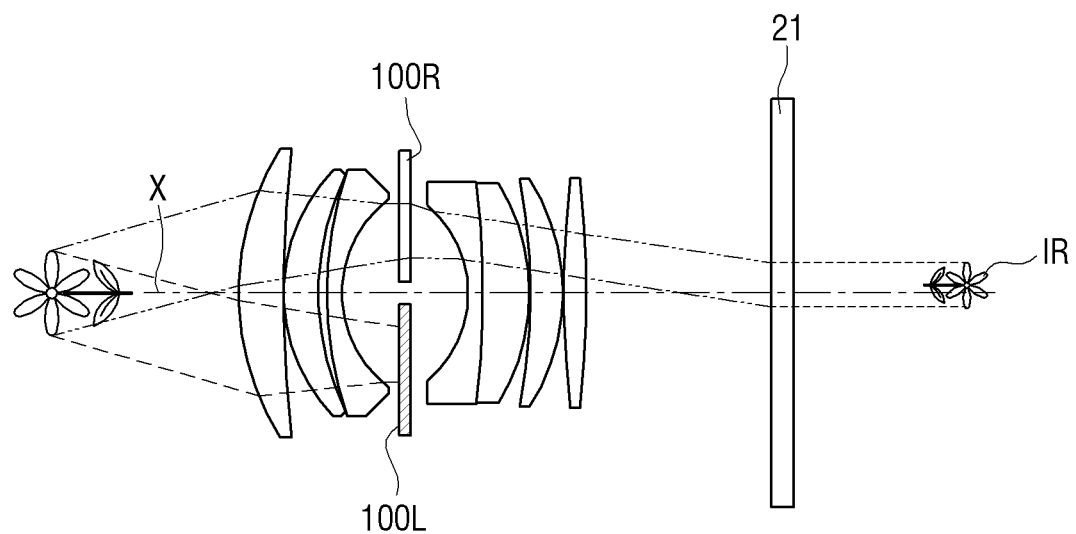
FIG. 3A is a diagram illustrating an example of imaging a right-eye image using the image capturing apparatus of FIG. 1, according to an exemplary embodiment.
Figure 3B:
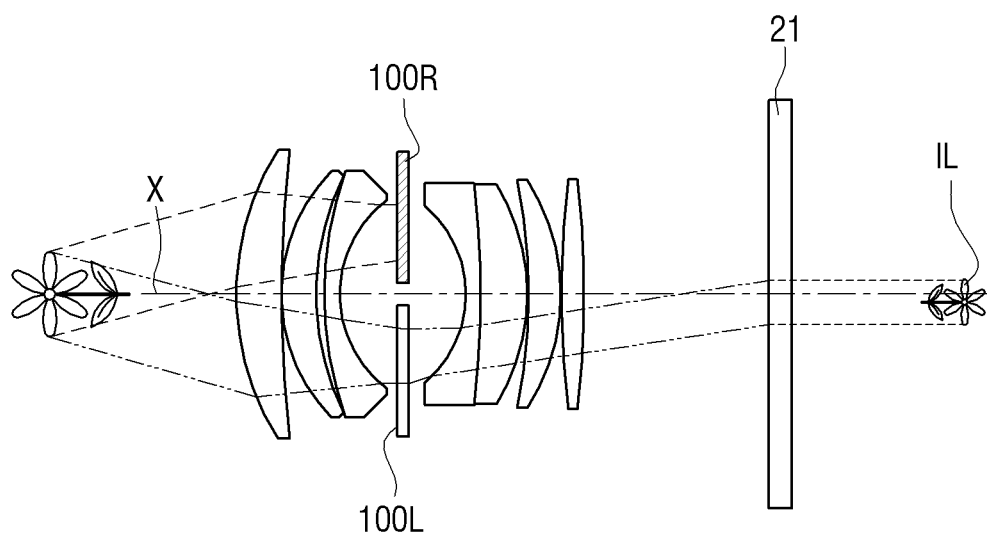
FIG. 3B is a diagram illustrating an example of imaging a left-eye image using the image capturing apparatus of FIG. 1, according to an exemplary embodiment.

FIG. 3A is a diagram illustrating an example of capturing a right-eye image by the image capturing apparatus of FIG. 1, and FIG. 3B is a diagram illustrating an example of capturing a left-eye image by the image capturing apparatus of FIG. 1, according to an exemplary embodiment.

Referring to FIG. 3A, when a right-eye image is captured, the right optical path is opened or unshielded by the first liquid crystal shutter 100R and the left optical path is blocked by the second liquid crystal shutter 100L so that a right-eye image IR is obtained by the imaging device 21. A state in which a liquid crystal shutter transmits light is so-called a 'white state,' and a state in which a liquid crystal shutter blocks light is so-called a 'black state.' Therefore, it can be seen that when the right-eye image IR is captured, the first liquid crystal shutter 100R is in a white state, while the second liquid crystal shutter 100L is in a black state.

Referring to FIG. 3B, when a left-eye image is captured, the right optical path is blocked by the first liquid crystal shutter 100R and the left optical path is opened or unshielded by the second liquid crystal shutter 100L so that a left-eye image IL is obtained by the imaging device 21. It can be seen that when the left-eye image IL is captured, the first liquid crystal shutter 100R is in the black state and the second liquid crystal shutter 100L is in the white state.

When capturing a 3D image, a plurality of right-eye images IR and a plurality of left-eye images IL are alternately captured at a considerably short cycle. The plurality of captured right-eye images IR and the plurality of captured left-eye images IL are displayed according to the order in which the images are captured, so that the viewers can perceive a stereoscopic image.

When the 3D image is captured, since the plurality of right-eye images IR and the plurality of left-eye images IL are alternately captured at a considerably short cycle, the close/open (shielding/unshielding) of the optical paths by the first and second liquid crystal shutters 100R and 100L also has to be performed at high speed. Therefore, when capturing the 3D image, the time in which the first and second liquid crystal shutters 100R and 100L are in the black state or in the white state is remarkably short (for example, about 15 ms). In other words, the cycle of close/open (shielding/unshielding) of the optical paths by the first and second liquid crystal shutters 100R and 100L when the 3D image is captured is very short.

In the room temperature environment, since the response speed of the liquid crystal is sufficiently fast, the open/close (shielding/unshielding) of the optical paths by the first and second liquid crystal shutters 100R and 100L can be smoothly performed. However, in the low temperature environment (for example, −10° C.), the response speed of the liquid crystal is too slow to allow the first and second liquid crystal shutters 100R and 100L to close/open (shield/unshield) the optical path at the short cycle.

Figure 4:
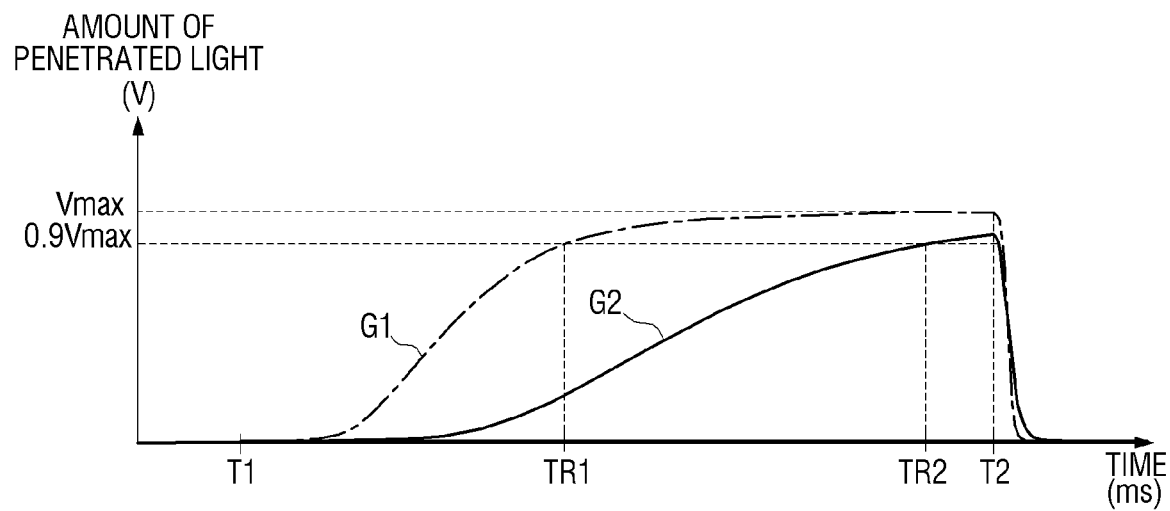
FIG. 4 is a graph illustrating response speeds of a liquid crystal shutter in a room temperature environment and in a low temperature environment when capturing a 3D image using a conventional image capturing apparatus.

The above-described problem (i.e., reduction in the response speed) will be described in more detail with reference to FIG. 4. FIG. 4 shows a graph indicating response speed of the conventional liquid crystal shutter in the room temperature environment and in the low temperature environment.

Lines G1 and G2 illustrated in FIG. 4 represent the amount of light penetrating a conventional liquid crystal shutter, measured using a photodiode and with respect to time, when the conventional liquid crystal shutter performs the closing/opening operation to shield/unshield the optical path. Here, the line G1 shows a result obtained in the room temperature environment, and the line G2 shows a result obtained in the low temperature environment (−10° C.).

In FIG. 4, a horizontal axis indicates time (ms), and a vertical axis indicates voltage (V) corresponding to an amount of penetrated light, which is measured using the photodiode. On the horizontal axis, T1 is a point of time when the liquid crystal shutter is changed from a black state to a white state, and T2 is a point of time when the liquid crystal shutter is changed from a white state to a black state. Therefore, T1-T2 interval is a white interval, which is an interval during which a driving voltage is not applied to the liquid crystal shutter. On the vertical axis, Vmax indicates a maximum amount of light penetrating through the liquid crystal shutter in the room temperature environment, and 0.9 Vmax indicates an amount of penetrated light corresponding to 90% of Vmax and corresponds to a minimum amount of penetrated light for capturing an image normally. Therefore, TR1 is a point of time when the amount of light penetrating the liquid crystal shutter in the room temperature environment reaches 0.9 Vmax, and TR2 is a point of time when the amount of light penetrating the liquid crystal shutter in the low temperature environment reaches 0.9 Vmax.

When comparing the two lines G1 and G2, it can be seen that TR2 in the low temperature environment is much greater than TR1 in the room temperature environment. This means that the response speed in the low temperature environment is slower than that in the room temperature environment, since a viscosity of liquid crystal in the low temperature environment is increased. Further, it can be seen that TR2-T2 interval in the line G2, which indicates an interval during which an image can be normally captured in the low temperature environment, is much smaller than TR1-T2 interval in the line G1, which indicates an interval during which an image can be normally captured in the room temperature environment.

As a result, the amount of light penetrating the liquid crystal shutter is not sufficient in the white period (TR2-T2 interval), due to slowdown of the response speed of liquid crystal in the low temperature environment. In other word, this means that open/close (unshielding/shielding) of the optical path by the liquid crystal shutter in the related art may be not smoothly performed in the low temperature environment.

Various embodiments include a method for solving the problems caused in the low temperature environment. Since the configuration of the above-described first and second liquid crystal shutters 100R and 100L of the digital camera 1 are the same, the method according to the various embodiments will be described based on the first liquid crystal shutter 100R.

Figure 5:
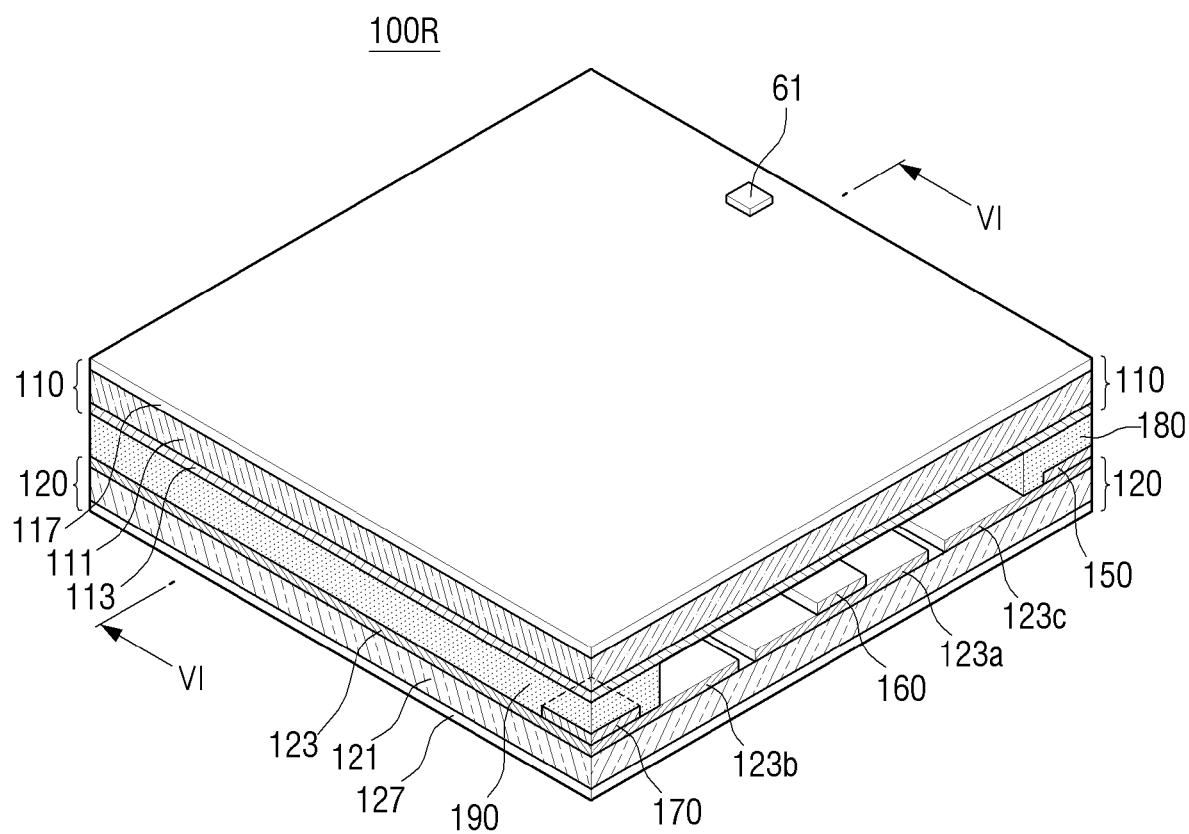
FIG. 5 is a perspective view illustrating a liquid crystal shutter provided in the image capturing apparatus of FIG. 1, according to an exemplary embodiment.
Figure 6:
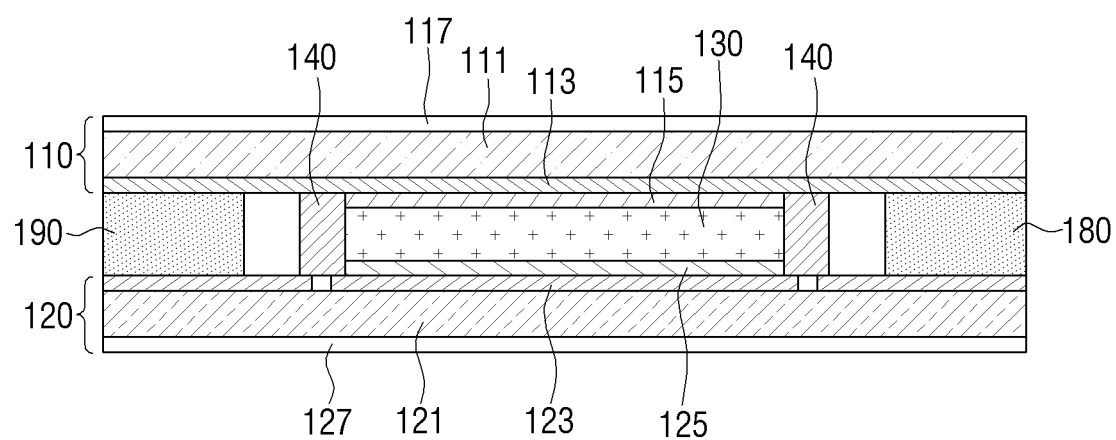
FIG. 6 is a cross-sectional view illustrating the liquid crystal shutter taken along line VI-VI of FIG. 5.

FIG. 5 is a perspective view illustrating the first liquid crystal shutter 110R provided to the image capturing apparatus of FIG. 1, according to an exemplary embodiment. FIG. 6 is a cross-sectional view of the first liquid crystal shutter 100R taken along line VI-VI of FIG. 5, and FIG. 7 is a plan view illustrating a second plate 120 (lower plate) provided to the first liquid crystal shutter 100R of FIG. 5.

Figure 7:
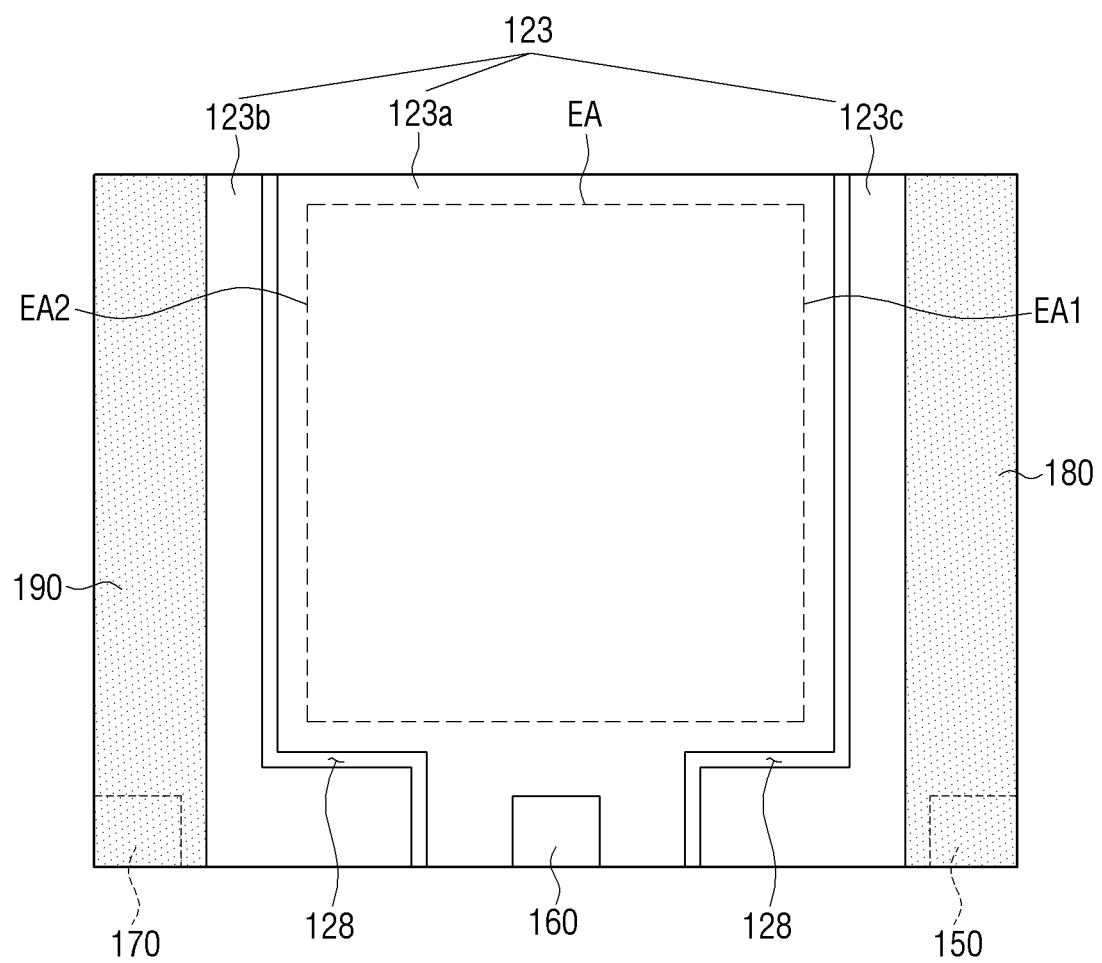
FIG. 7 is a plan view illustrating a second plate (lower plate) provided in the liquid crystal shutter of FIG. 5.

Referring to FIGS. 5 to 7, the first liquid crystal shutter 100R includes a first plate 110, a second plate 120, a liquid crystal layer 130 disposed between the first plate 110 and the second plate 120, and a sealant 140 surrounding the liquid crystal layer 130. Here, the first plate 110 and the second plate 120 may be called an upper plate and a lower plate, respectively.

The first plate 110 includes a rectangular-shaped first transparent substrate 111, a first transparent electrode layer 113 and a first alignment film 115 sequentially formed on an inner surface of the first transparent substrate 111, and a polarizing film 117 formed on an outer surface of the first transparent substrate 111.

The second plate 120 may be disposed parallel to the first plate 110 and may be spaced at a predetermined distance apart from the first plate 110. Similar to the first plate 110, the second plate 120 includes a rectangular-shaped second transparent substrate 121, a second transparent electrode layer 123 and a second alignment film 125 sequentially formed on an inner surface of the second transparent substrate 121, and a second polarizing film 127 formed on an outer surface of the second transparent substrate 121.

The first and second transparent substrates 111 and 121 are disposed parallel to each other and manufactured to have the same size. In an alternative exemplary embodiment, either one of the transparent substrates 111 and 121 may be manufactured to be larger than the other one. The first and second transparent substrates 111 and 121 are manufactured of transparent glass. Alternatively, the first and second transparent substrates 111 and 121 may be manufactured of transparent plastic.

The first transparent electrode layer 113 is formed as one body. On the other hand, as illustrated in FIG. 7, the second transparent electrode layer 123 includes an effective electrode layer 123a, a left electrode layer 123b, and a right electrode layer 123c separated from each other by separation grooves 128. Here, the left electrode layer 123b is disposed on the left of the effective electrode layer 123a, and the right electrode layer 123c is disposed on the right of the effective electrode layer 123a. In FIG. 7, an EA area, which is indicated by a dotted line in the effective electrode layer 123a of the second transparent electrode layer 123, denotes an effective area corresponding to the liquid crystal layer 130. The first and second transparent electrode layers 113 and 123 may be manufactured of indium thin oxide (ITO). Alternatively, the first and second transparent electrode layers 113 and 123 may be manufactured of indium zinc oxide (IZO).

The first and second polarizing films 117 and 127 have polarization axes perpendicular to each other. The second temperature sensor 61 configured to measure a temperature of the first liquid crystal shutter 100R is disposed on an outer surface of the first polarizing film 117. The second temperature sensor 61 may be disposed on another position of the first liquid crystal shutter 100R. For example, the second temperature sensor 61 may be disposed on an outer surface of the second polarizing film 127.

The first and second alignment films 115 and 125 cause liquid crystal molecules of the liquid crystal layer 130 to be aligned in a twisted form. Therefore, the first alignment film 115 has a plurality of grooves (not shown) formed parallel to the polarization axis of the polarizing film 117, and the second alignment film 125 has a plurality of grooves (not shown) formed parallel to the polarization axis of the second polarizing film 127.

The liquid crystal molecules of the liquid crystal layer 130 are aligned in a twisted form or a non-twisted form according to an electric potential difference (a first potential difference) between the first transparent electrode layer 113 and the effective electrode layer 123a. More specifically, when there is no first potential difference (the first potential difference=0 (zero)), the liquid crystal molecules are aligned in the twisted form so that the first liquid crystal shutter 100R is in the 'white' state, which transmits light. When the first potential difference is a specific value larger than 0 (zero) (for example, 10 V), the twisted arrangement of the liquid crystal molecules is released so that the first liquid crystal shutter 100R is in the 'black' state, which blocks light.

As illustrated in FIGS. 5 and 7, the liquid crystal shutter 100R includes a first electrode 150 and a second electrode 160 to form the first potential difference between the first transparent electrode layer 113 and the second transparent electrode layer 123. The first liquid crystal shutter 100R further includes a third electrode (a heating electrode) 170 to generate a second potential difference for Joule heating in the first transparent electrode layer 113. Further, the first liquid crystal shutter 100R includes a first conductive member 180 configured to electrically connect the first electrode 150 and the first transparent electrode layer 113, and a second conductive member 190 configured to electrically connect the third electrode (the heating electrode) 170 and the first transparent electrode layer 113.

The first to third electrodes 150, 160, and 170 may be made of a metal material having an electrical conductivity, for example, silver (Ag) or copper (Cu). Further, the first, second, and third electrodes 150, 160, and 170 are respectively disposed on edge regions of the right electrode layer 123c, the effective electrode layer 123a, and the left electrode layer 123b of the second transparent electrode layer 123. The second electrode 160 is disposed between the first electrode 150 and the third electrode (heating electrode) 170.

As illustrated in FIG. 7, the first to third electrodes 150, 160, and 170 are independently attached to the second transparent electrode layer 123. Alternatively, a flexible printed circuit board (FPCB) including the first to third electrodes 150, 160, and 170 may be prepared, and the FPCB may be attached to the second transparent electrode layer 123 so that the first to third electrodes 150, 160, and 170 are attached to the second transparent electrode layer 123. The FPCB may be attached to the second transparent electrode layer 123 using an anisotropic conductive film (ACF).

The first electrode 150 and the third electrode (heating electrode) 170 are electrically connected to the first transparent electrode layer 113 through the first and second conductive members 180 and 190, respectively.

Here, the first and second conductive members 180 and 190 may be formed of a conductive material. For example, the first and second conductive members 180 and 190 may be manufactured of silver paste or conductive bond. Alternatively, the first and second conductive members 180 and 190 may include a conductive ball. However, in the case of conductive ball, contact resistance in the first and second conductive members 180 and 190 may be increased.

Further, the first and second conductive members 180 and 190 are formed to be disposed to face each other with the effective area EA of the effective electrode layer 123a interposed therebetween and to extend along two opposite sides EA1 and EA2 of the effective area EA. The first and second conductive members 180 and 190 are elongated so that heating of the liquid crystal layer 130 by the second potential difference formed between the first electrode 150 and the third electrode (heating electrode) 170 may be more uniformly performed.

Figure 8:
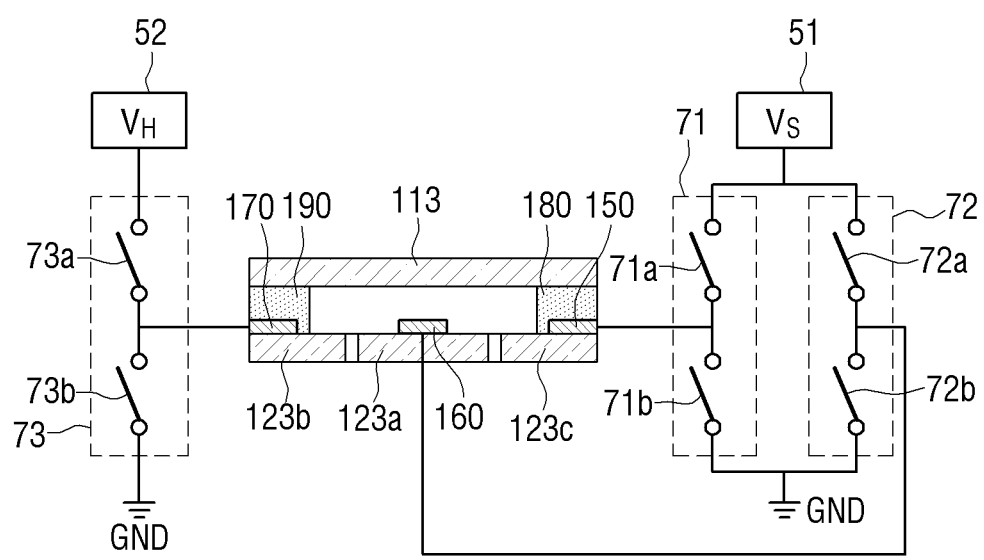
FIG. 8 is a schematic diagram illustrating detailed configurations of a shutter driver and a power supply configured to drive the liquid crystal shutter illustrated in FIG. 5, according to an exemplary embodiment.

FIG. 8 is a schematic diagram illustrating detailed configurations of the shutter driver and the power supply configured to drive the liquid crystal shutter of FIG. 5, according to an exemplary embodiment.

Referring to FIG. 8, in connection with the driving of the first liquid crystal shutter 100R, the first shutter driver 70 (see FIG. 2) of the digital camera 1 includes a first switching unit 71, a second switching unit 72, and a third switching unit 73, and the power supply unit 50 (see FIG. 2) of the digital camera 1 includes a first power supply 51 and a second power supply 52.

The first power supply 51 is configured to supply power to the first liquid crystal shutter 100R to close/open (unshield/shield) an optical path. FIG. 8 illustrate that a voltage $V_S$, which is supplied from the first power supply 51, is 10 V. The second power supply 52 is configured to heat the liquid crystal layer 130. FIG. 8 illustrates that a voltage $V_H$, which is supplied from the second power supply 52, is also 10 V.

The first switching unit 71 selectively connects the first electrode 150 to either the first power supply 51 or a ground GND. The first switching unit 71 include a first switch 71a configured to selectively connect the first electrode 150 to the first power supply 51, and a second switch 71b configured to selectively connect the first electrode 150 to the ground GND.

The second switching unit 72 selectively connects the second electrode 160 to either the first power supply 51 or the ground GND. The second switching unit 72 include a first switch 72a configured to selectively connect the second electrode 160 to the first power supply 51, and a second switch 72b configured to selectively connect the second electrode 160 to the ground GND.

The third switching unit 73 selectively connects the third electrode (heating electrode) 170 to either the second power supply 52 or the ground GND. The third switching unit 73 include a first switch 73a configured to connect the heating electrode 170 to the second power supply 52, and a second switch 73b configured to connect the heating electrode 170 to the ground GND.

Next, an operation of the digital camera 1 for closing/opening (shielding/unshielding) an optical path and for heating the first liquid crystal shutter 100R will be described with reference to FIGS. 9 and 10A to 10C.

Figure 9:
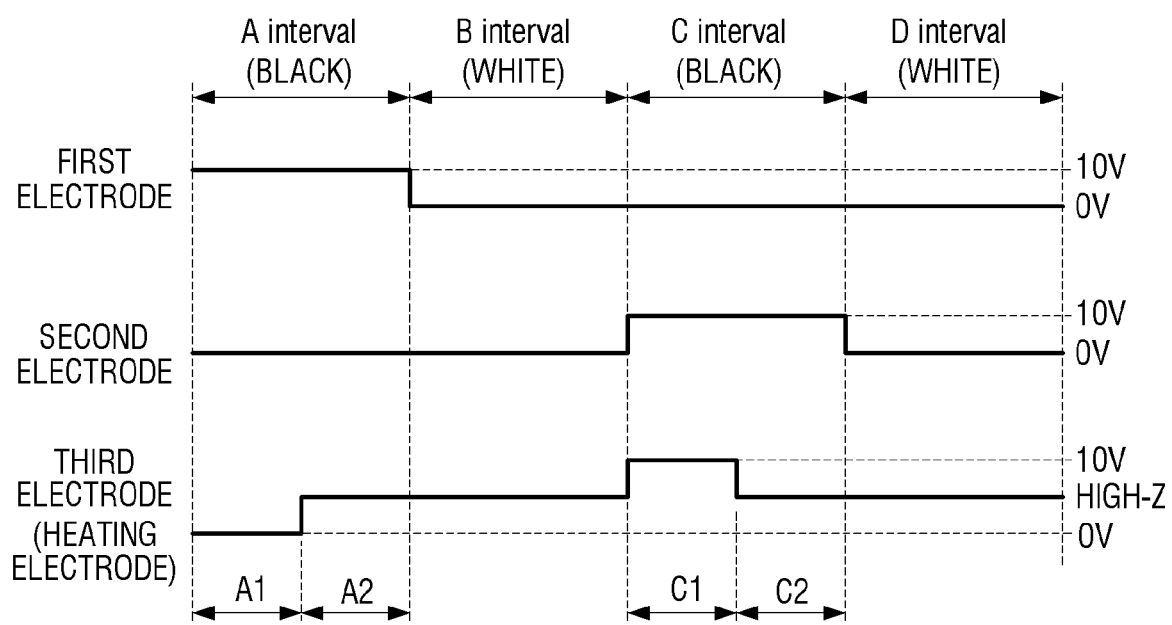
FIG. 9 is a graph illustrating potentials of a first electrode to a third electrode of a liquid crystal shutter when close/open operations to unshield/shield an optical path is performed by the liquid crystal shutter of FIG. 5 in a low temperature environment, according to an exemplary embodiment.
Figure 10A:
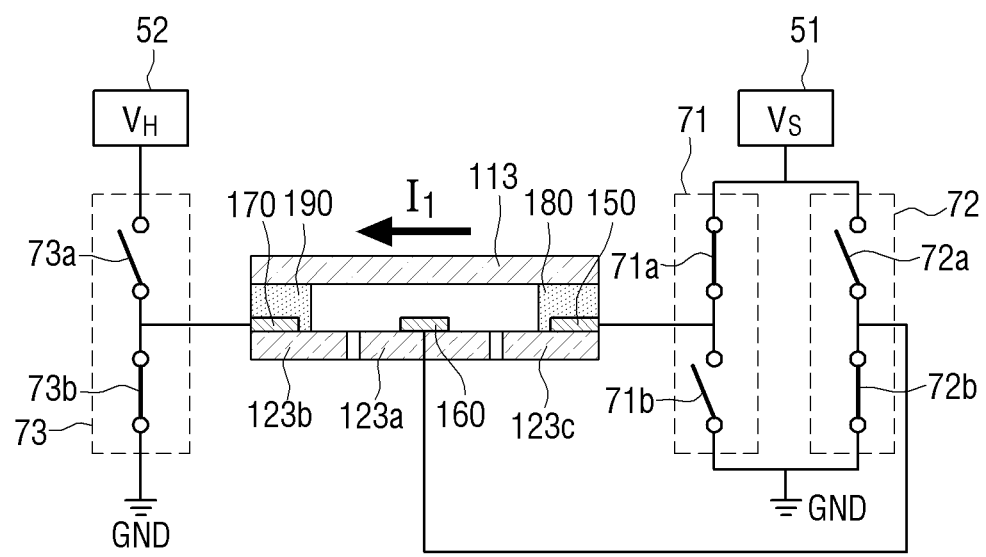
FIG. 10A is a schematic diagram illustrating a switching state for a first electrode to a third electrode of the liquid crystal shutter when the liquid crystal shutter of FIG. 5 is in the A1 interval of FIG. 9, according to an exemplary embodiment.
Figure 10B:
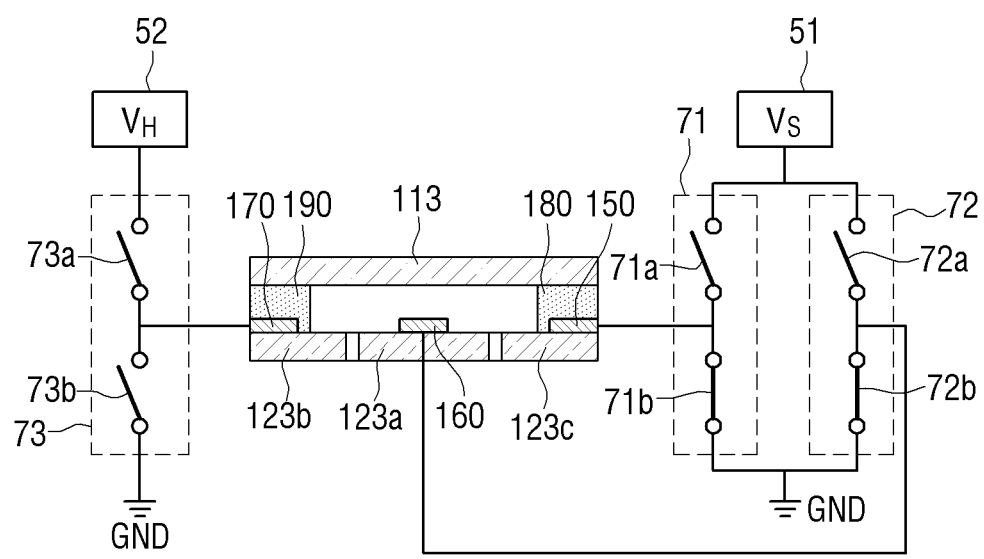
FIG. 10B is a schematic diagram illustrating a switching state for a first electrode to a third electrode of the liquid crystal shutter when the liquid crystal shutter of FIG. 5 is in the B or D interval of FIG. 9, according to an exemplary embodiment.
Figure 10C:
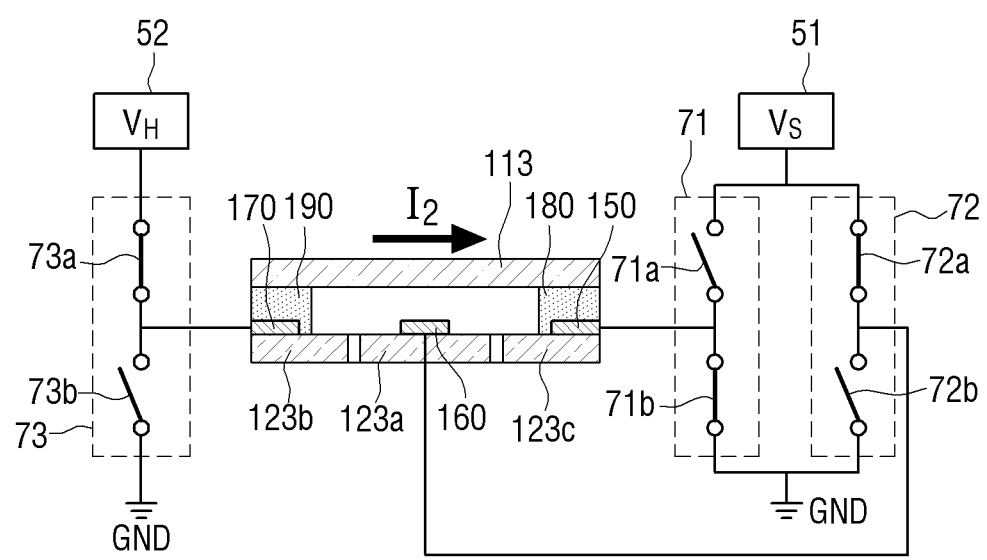
FIG. 10C is a schematic diagram illustrating a switching state for a first electrode to a third electrode of the liquid crystal shutter when the liquid crystal shutter of FIG. 5 is in the C1 interval of FIG. 9, according to an exemplary embodiment.

FIG. 9 illustrates a graph indicating potential differences of the first to third electrodes 150, 160 and 170 of the first liquid crystal shutter 100R when closing/opening operation to shield/unshield an optical path is performed by the first liquid crystal shutter 100R of FIG. 5 in the low temperature environment, according to an exemplary embodiment. FIG. 10A is a schematic diagram illustrating switching states of the first to third electrodes 150, 160, and 170 of the first liquid crystal shutter 100R of FIG. 5 when the first liquid crystal shutter 100R is in the A1 interval of FIG. 9, according to an embodiment. FIG. 10B is a schematic diagram illustrating switching states of the first to third electrodes 150, 160, and 170 of the first liquid crystal shutter 100R of FIG. 5 when the first liquid crystal shutter 100R is in the B interval or the D interval of FIG. 9, according to an embodiment. FIG. 10C is a schematic diagram illustrating switching states of the first to third electrodes 150, 160, and 170 of the first liquid crystal shutter 100R of FIG. 5 when the first liquid crystal shutter 100R is in the C1 interval of FIG. 9.

Referring to FIG. 9, when the first liquid crystal shutter 100R performs a close/open operation to shield/unshield an optical path, the first liquid crystal shutter 100R sequentially operates in the A, B, C, and D intervals repeatedly.

First, the A interval will be described.

As illustrated in FIG. 10A, in the A interval, the first electrode 150 is connected to the first power supply 51, which provides a voltage of 10 V thereto, by the first switching unit 71, and the second electrode 160 is connected to the ground GND by the second switching unit 72. At this time, the potential difference (first potential difference) between the first electrode 150 and the second electrode 160 is 10 V and therefore, the liquid crystal shutter 100R is in the 'black' state which blocks the light of an optical path.

As illustrated in FIG. 10A, in the initial A1 interval of the A interval, the heating electrode 170 is connected to the ground GND by the third switching unit 73. Therefore, a second potential difference corresponding to 10 V is formed between the first electrode 150 and the heating electrode 170. Thus, the second potential difference of 10 V is also formed between one side region of the first transparent electrode layer 113, which is electrically connected to the first electrode 150 through the first conductive member 180, and the other side region of the first transparent electrode layer 113, which is electrically connected to the heating electrode 170 through the second conductive member 190. As illustrated in FIG. 10A, due to the second potential difference, a first current $I_1$ flows from the one side region of the first transparent electrode layer 113 to the other side region thereof, and thus Joule heating is generated from the first transparent electrode layer 113. The liquid crystal layer 130 (see FIG. 6) below the first transparent electrode layer 113 is heated by the Joule heating. Thus, it can be understood that the initial A1 interval of the A interval is a heating interval.

In the A2 interval of the A interval, the heating electrode 170 is not connected to either the second power supply 52 or the ground GND. That is, the heating electrode 170 is in a high impedance (High-Z) state in the A2 interval. At this time, since there is no potential difference between the first electrode 150 and the heating electrode 170 (that is, the second potential difference=0 V), the first transparent electrode layer 113 is in an equipotential state, and thus no current flow through the first transparent electrode layer 113 and Joule heating is not generated. Therefore, it can be understood that the A2 section of the A interval is a non-heating interval.

Next, the B interval will be described.

As illustrated in FIG. 10B, in the B interval, the first electrode 150 is connected to the ground GND by the first switching unit 71, and the second electrode 160 is connected to the ground GND by the second switching unit 72. Therefore, since the potential difference (the first potential difference) between the first electrode 150 and the second electrode 160 becomes 0 V, the liquid crystal shutter 100R enters the 'white' state, which transmits light. On the other hand, the heating electrode 170 is still maintained in a High-Z state in the B interval, and thus the B interval is a non-heating interval in which Joule heating is not generated.

Next, the C interval will be described.

As illustrated in FIG. 10C, in the C interval, the first electrode 150 is connected to the ground GND by the first switching unit 71 and the second electrode 160 is connected to the first power supply 51, which provides a voltage of 10 V thereto, by the second switching unit 72. At this time, the potential difference (first potential difference) between the first electrode 150 and the second electrode 160 is 10 V and therefore, the liquid crystal shutter 100R enters in the 'black' state, which blocks light of an optical path.

As illustrated in FIG. 10C, in the initial C1 interval of the C interval, the heating electrode 170 is connected to the second power supply 52, which provides the voltage of 10 V thereto, by the third switching unit 73. Therefore, a second potential difference corresponding to 10 V is formed between the heating electrode 170 and the first electrode 150. Thus, the second potential difference of 10 V is also formed between the other side region of the first transparent electrode layer 113, which is electrically connected to the heating electrode 170 through the second conductive member 190, and the one side region of the first transparent electrode layer 113, which is electrically connected to the first electrode 150 through the first conductive member 180. As illustrated in FIG. 10C, due to the second potential difference, a second current $I_2$ flows from the left region of the first transparent electrode layer 113 to the right region thereof, and thus Joule heating is generated from the first transparent electrode layer 113. The liquid crystal layer 130 below the first transparent electrode layer 113 is heated by the Joule heating. Thus, it can be understood that the initial C1 interval of the C interval is a heating interval.

In the C2 interval of the C interval, the heating electrode 170 is not connected to either the second power supply 52 or the ground GND. That is, the heating electrode 170 is in a High-Z state in the C2 interval. At this time, since there is no potential difference between the heating electrode 170 and the first electrode 150 (that is, the second potential difference=0 V), the first transparent electrode layer 113 is in an equipotential state. Therefore, it can be understood that the C2 interval of the C interval is a non-heating interval.

Finally, the D interval will be described.

The operation of the first liquid crystal shutter 100R in the D interval is the same as that in the B interval. Therefore, since the first potential difference in the D interval is 0 V, the liquid crystal shutter 100R enters the 'white' state, and the heating electrode 170 is maintained as a High-Z state. The D interval is a non-heating period in which Joule heating is not generated from the first transparent electrode layer 113.

As described above, when the first liquid crystal shutter 100R performs close/open operation to shield/unshield the optical path in the low temperature environment, the initial heating intervals A1 and C1 is respectively included in the black intervals A and C. Joule heating generated from the first transparent electrode layer 113 in each of the heating intervals A1 and C1 is transferred to the liquid crystal layer 130 below the first transparent electrode layer 113, and thus the liquid crystal layer 130 is heated. Therefore, viscosity of the liquid crystal molecules is reduced and the response speed of the liquid crystal can be improved. As a result, the first liquid crystal shutter 100R can smoothly perform the close/open operation to shield/unshield the optical path in the low temperature environment.

On the other hand, durations of the initial heating intervals A1 and C1 of the black intervals A and C may be determined based on a temperature of the liquid crystal shutter as measured by the second temperature sensor 61 (see FIG. 5) mounted on the first liquid crystal shutter 100R. More specifically, the second temperature sensor 61 may continuously sense the temperature of the first liquid crystal shutter 100R and transmit a sensing result to the controller 40 (see FIG. 2) of the digital camera 1. The controller 40 may determine the durations of the above-described heating intervals A1 and C1 based on the received temperature of the first liquid crystal shutter 100R, and may control the third switching unit 73 of the first shutter driver 70 (see FIG. 2) according to the determination result so that the controller 40 may cause the liquid crystal layer 130 to be heated for the determined duration.

The heating of the liquid crystal layer 130 described above is performed while the close/open operation to shield/unshield the optical path is performed by the first liquid crystal shutter 100R.

On the other hand, the digital camera 1, in the low temperature environment, may pre-heat the liquid crystal layer 130 during a stand-by time period prior to operation. For the pre-heating of the liquid crystal layer 130, first, the controller 40 of the digital camera 1 determines the stand-by time period for pre-heating based on the ambient temperature measured by the above-described first temperature sensor 22 (see FIG. 1). Then, the controller 40 notifies that the digital camera 1 is in the stand-by mode through a display unit (not shown) disposed in the camera body (see 20 of FIG. 1), and controls the first shutter driver 70 (see FIG. 2) to cause the first to third electrodes 150, 160, and 170 of the first liquid crystal shutter 100R to be in any one of the switching states illustrated in FIGS. 10A to 10C for the stand-by time period. The first current $I_1$ or the second current $I_2$ may flows in the first transparent electrode layer 113 for the stand-by time period to generate Joule heating. The liquid crystal layer 130 is thus heated by the generated Joule heating for the stand-by time period. The stand-by time period may be much longer than each of the heating intervals A1 and C1 during the above-described close/open operation to shield/unshield the optical path. The stand-by time period may be, for example, 5 seconds, 10 seconds, 15 seconds, 20 seconds, and the like.

In the low temperature environment, although the digital camera 1 may be designed only to perform the pre-heating or only to perform the heating in each black interval described above, the digital camera 1 may preferably perform the pre-heating for the liquid crystal layer 130 for the stand-by time period in the initial use thereof as well as perform a post-heating operation of the liquid crystal layer 130 in each black period during the use thereof. In particular, when only the heating in each black period is performed without the pre-heating, in general, the durations of the heating intervals A1 and C1 are considerably increased as compared to when the pre-heating is performed. Thus, it should be noted that the long duration becomes a factor which causes the light blocking performance of the liquid crystal shutter 100R to be degraded in the black interval.

Figure 11:
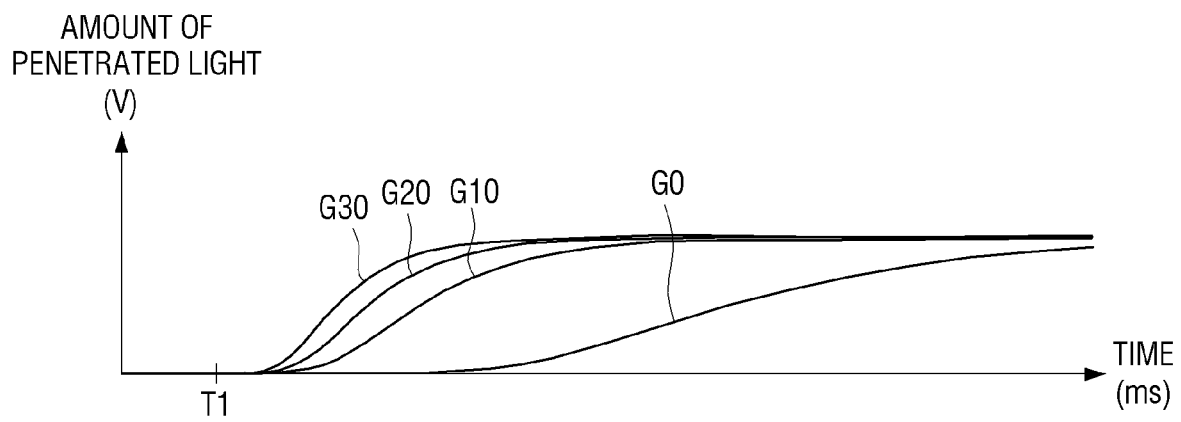
FIG. 11 is a graph illustrating change in response speed according to heating time of the liquid crystal shutter of FIG. 5, according to an exemplary embodiment.

FIG. 11 is a graph illustrating change in response speed of the liquid crystal shutter of FIG. 5 according to the heating time of the liquid crystal shutter, according to an embodiment.

Lines illustrated in FIG. 11 are results obtained by measuring an amount of light penetrating the first liquid crystal shutter 100R using the photodiode after the first liquid crystal shutter 100R has been left in the low temperature environment (−10° C.) for 4 hours. Then, the first liquid crystal shutter 100R performs close/open operation to shield/unshield an optical path while heating of the liquid crystal layer 130 is performed over the whole black interval (A and C periods in FIG. 9). Lines G0, G10, G20, and G30 indicate the results obtained in cases in which the operating time corresponds to the elapse of time of 0 second, 10 seconds, 20 seconds, and 30 seconds, respectively. On a horizontal axis (a time axis), T1 indicates a point of time when the black interval is changed into the white interval in the liquid crystal shutter.

It can be understood from comparison between the lines G0 and G10 that speed in the increase of the amount of light penetrating the first liquid crystal shutter 100R after 10 seconds have elapsed is faster than the initial state, in the white interval. This means that the response speed of the first liquid crystal shutter 100R after 10 seconds have elapsed is further increased as compared with the initial state. Further, it can be understood from comparison between the line G0 and the lines G10, G20, and G30 that the response speed of the liquid crystal shutter 100R becomes faster as more time has elapsed.

The improvement in the response speed of the first liquid crystal shutter 100R is caused by the reduction in the viscosity of the liquid crystal as the liquid crystal layer 130 is heated by the Joule heating generated from the first transparent electrode layer 113 as described above.

Therefore, it can be seen from the digital camera 1 according to the exemplary embodiment that slowdown in the response speed of the first liquid crystal shutter 100R in the low temperature environment can be solved.

In addition, since the heat is generated in the first transparent electrode layer 113 adjacent to the liquid crystal layer 130, the generated heat can be effectively transferred to the liquid crystal layer 130. Since the transparent electrode layer 113 is covered by the first transparent substrate 111 and the first polarizing film 117, the first transparent substrate 111 and the first polarizing film 117 serve as an insulator to the heat generated by the first transparent electrode layer 113.

Since the heat is generated in the first transparent electrode layer 113, which is an essential component of the first liquid crystal shutter 100R without other additional heating members, the assembly is simple and the number of components is reduced.

As described above, the first liquid crystal shutter 100R has the same structure as the second liquid crystal shutter 100L and therefore, the description of the first liquid crystal shutter 100R is also applicable to the second liquid crystal shutter 100L. Therefore, the configuration, operation, and effect of the second liquid crystal shutter 100L can be fully understood from the above-described first liquid crystal shutter 100R.

On the other hand, the above-described exemplary embodiment has been illustrated that the Joule heating is generated only in the first transparent electrode layer 113. In an alternative exemplary embodiment, the structure may be modified so that the Joule heating is generated in the first transparent electrode layer 113 and in the second transparent electrode layer 123. In the alternative exemplary embodiment, in addition to the heating electrode (first heating electrode) 170, an additional heating electrode (second heating electrode) configured to generate a potential difference (third potential difference) for generating Joule heating in the second transparent electrode layer 123 is provided.

The foregoing exemplary embodiments and advantages are merely exemplary and are not to be construed as limiting the inventive concept. The exemplary embodiments can be readily applied to other types of devices. Also, the description of the exemplary embodiments is intended to be illustrative, and not to limit the scope of the claims, and many alternatives, modifications, and variations will be apparent to those skilled in the art.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A liquid crystal shutter, comprising:
   a first plate comprising a first transparent electrode layer;
   a second plate disposed parallel to the first plate and comprising a second transparent electrode layer;
   a liquid crystal layer disposed between the first plate and the second plate and is configured to transmit or block light according to a first potential difference between the first transparent electrode layer and the second transparent electrode layer;
   a heating electrode configured to generate a second potential difference for generating heat in the first transparent electrode layer; and
   a first electrode and a second electrode electrically connected to the first transparent electrode layer and the second transparent electrode layer, respectively, so as to generate the first potential difference between the first transparent electrode layer and the second transparent electrode layer,
   wherein the second potential difference is formed between the heating electrode and the first electrode, and
   wherein the second transparent electrode layer comprises a plurality of electrode layers separated by separation grooves, and the first electrode, the second electrode, and the heating electrode are disposed on the electrode layers, respectively.

2. The liquid crystal shutter as claimed in claim 1, wherein the plurality of electrode layers of the second transparent electrode layer comprises:
   an effective electrode layer comprising an effective area covered by the liquid crystal layer and in which the second electrode is disposed;
   a right electrode layer disposed separately from the effective electrode layer on a right side of the effective electrode layer and in which the first electrode is disposed; and
   a left electrode layer disposed separately from the effective electrode layer on a left side of the effective electrode layer and in which the heating electrode is disposed.

3. The liquid crystal shutter as claimed in claim 2, further comprising:
   a first conductive member configured to electrically connect the first electrode and the first transparent electrode layer; and
   a second conductive member configured to electrically connect the heating electrode and the first transparent electrode layer.

4. The liquid crystal shutter as claimed in claim 3, wherein the first and second conductive members are disposed opposite of each other with the effective area interposed therebetween and to extend along two opposite sides of the effective area, respectively.

5. The liquid crystal shutter as claimed in claim 4, wherein each of the first and second conductive members is formed of silver paste or conductive bond.

6. A liquid crystal shutter, comprising:
   a first plate comprising a first transparent electrode layer;
   a second plate disposed parallel to the first plate and comprising a second transparent electrode layer;
   a liquid crystal layer disposed between the first plate and the second plate and is configured to transmit or block light according to a first potential difference between the first transparent electrode layer and the second transparent electrode layer;
   a first heating electrode configured to generate a second potential difference for generating heat in the first transparent electrode layer;

a second heating electrode configured to generate a third potential difference for generating heat in the second transparent electrode layer; and a first electrode and a second electrode electrically connected to the first transparent electrode layer and the second transparent electrode layer, respectively, so as to generate the first potential difference between the first transparent electrode layer and the second transparent electrode layer, wherein the second potential difference is formed between the first heating electrode and the first electrode, and wherein the second transparent electrode layer comprises a plurality of electrode layers separated by separation grooves, and the first electrode, the second electrode, and the first heating electrode are disposed on the electrode layers, respectively.

7. An image capturing apparatus, comprising:

an imaging device;

a plurality of imaging lenses configured to form an optical path between an object and the imaging device;

first and second liquid crystal shutters configured to divide the optical path into a first optical path and a second optical path when capturing a three-dimensional image;

first and second shutter drivers configured to drive the first and second liquid crystal shutters, respectively; and a controller configured to control operations of the first and second shutter drivers, wherein each of the first and second liquid crystal shutters comprises:
- a first plate comprising a first transparent electrode layer;
- a second plate disposed parallel to the first plate and comprising a second transparent electrode layer;
- a liquid crystal layer disposed between the first plate and the second plate and is configured to transmit or block light according to a first potential difference between the first transparent electrode layer and the second transparent electrode layer;
- a heating electrode configured to generate a second potential difference for generating heat in the first transparent electrode layer; and
- a first electrode and a second electrode electrically connected to the first transparent electrode layer and the second transparent electrode layer, respectively, so as to generate the first potential difference between the first transparent electrode layer and the second transparent electrode layer, wherein the second potential difference is formed between the heating electrode and the first electrode, and wherein the second transparent electrode layer comprises a plurality of electrode layers separated by separation grooves, and the first electrode, the second electrode, and the heating electrode are disposed on the electrode layers, respectively.

8. The image capturing apparatus as claimed in claim 7, wherein each of the first and second shutter drivers comprises:
- a first switching unit configured to selectively connect the first electrode to either a first power supply or a ground;
- a second switching unit configured to selectively connect the second electrode to either the first power supply or the ground; and
- a third switching unit configured to connect the heating electrode to either a second power supply or the ground.

9. The image capturing apparatus as claimed in claim 8, further comprising:
a first temperature sensor configured to sense an ambient temperature.

10. The image capturing apparatus as claimed in claim 9, wherein during a stand-by time period prior to starting an image capturing operation, when the ambient temperature sensed by the first temperature sensor is less than a reference temperature, each of the first and second shutter drivers connects the first electrode to the first power supply and connects the heating electrode to the ground, or connects the first electrode to the ground and connects the heating electrode to the second power supply.

11. The image capturing apparatus as claimed in claim 9, wherein during a heating interval belonging to an interval during which a corresponding liquid crystal shutter blocks light, when the ambient temperature sensed by the first temperature sensor is less than a reference temperature, each of the first and second shutter drivers connects the first electrode to the first power supply and connects the heating electrode to the ground, or connects the first electrode to the ground and connects the heating electrode to the second power supply.

12. The image capturing apparatus as claimed in claim 11, wherein each of the first and second liquid crystal shutters further comprises:
a second temperature sensor configured to measure a shutter temperature thereof.

13. The image capturing apparatus as claimed in claim 12, wherein the controller determines the heating interval based on the shutter temperature sensed by the second temperature sensor.

14. The image capturing apparatus as claimed in claim 7, wherein the image capturing apparatus is a digital camera.

* * * * *